May 9, 1939.　　　　F. C. BEST　　　　2,157,473
BRAKE FOR MOTOR VEHICLES
Filed June 12, 1936　　　　2 Sheets-Sheet 1
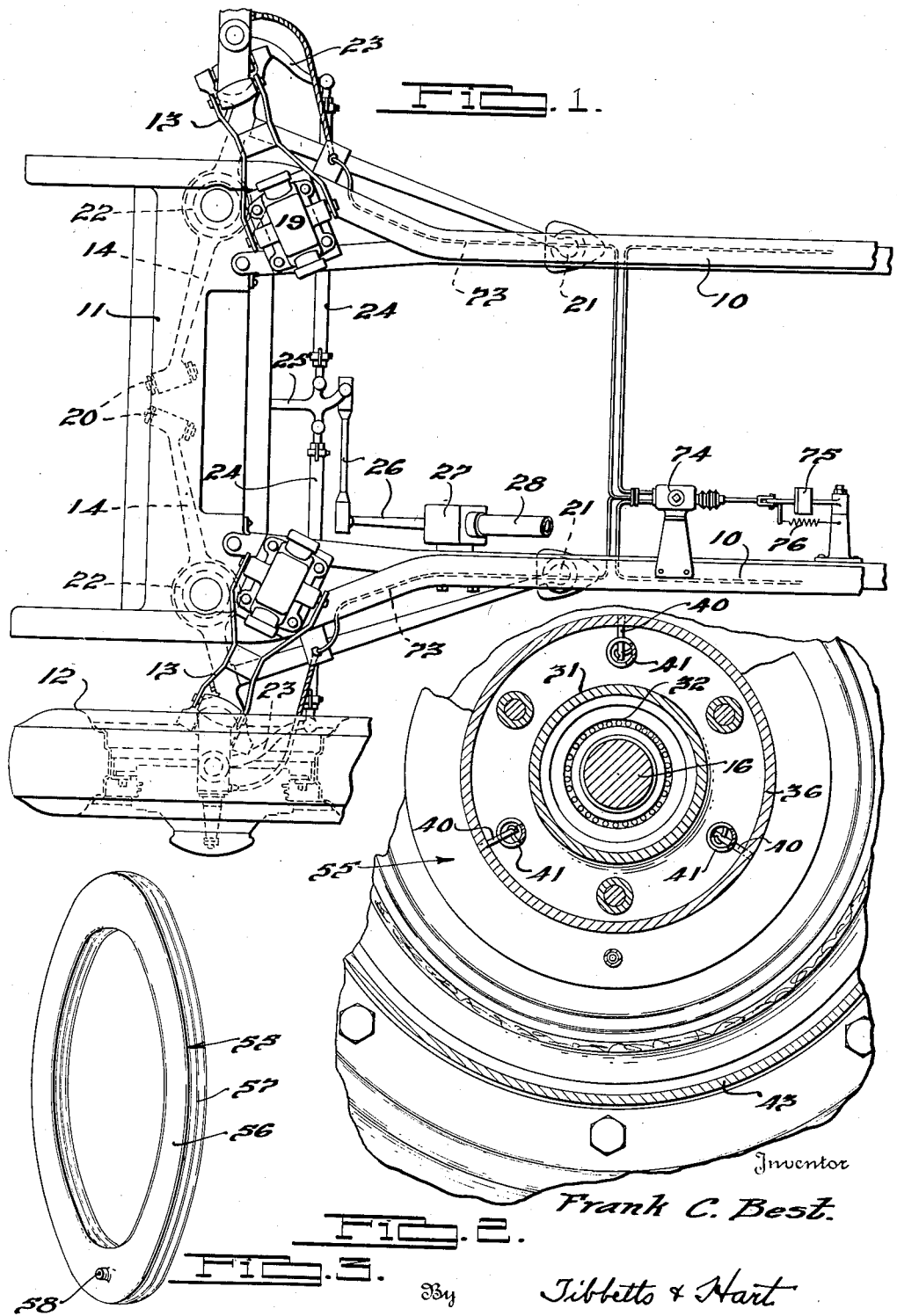
Inventor
Frank C. Best.
By Tibbetts & Hart
Attorneys

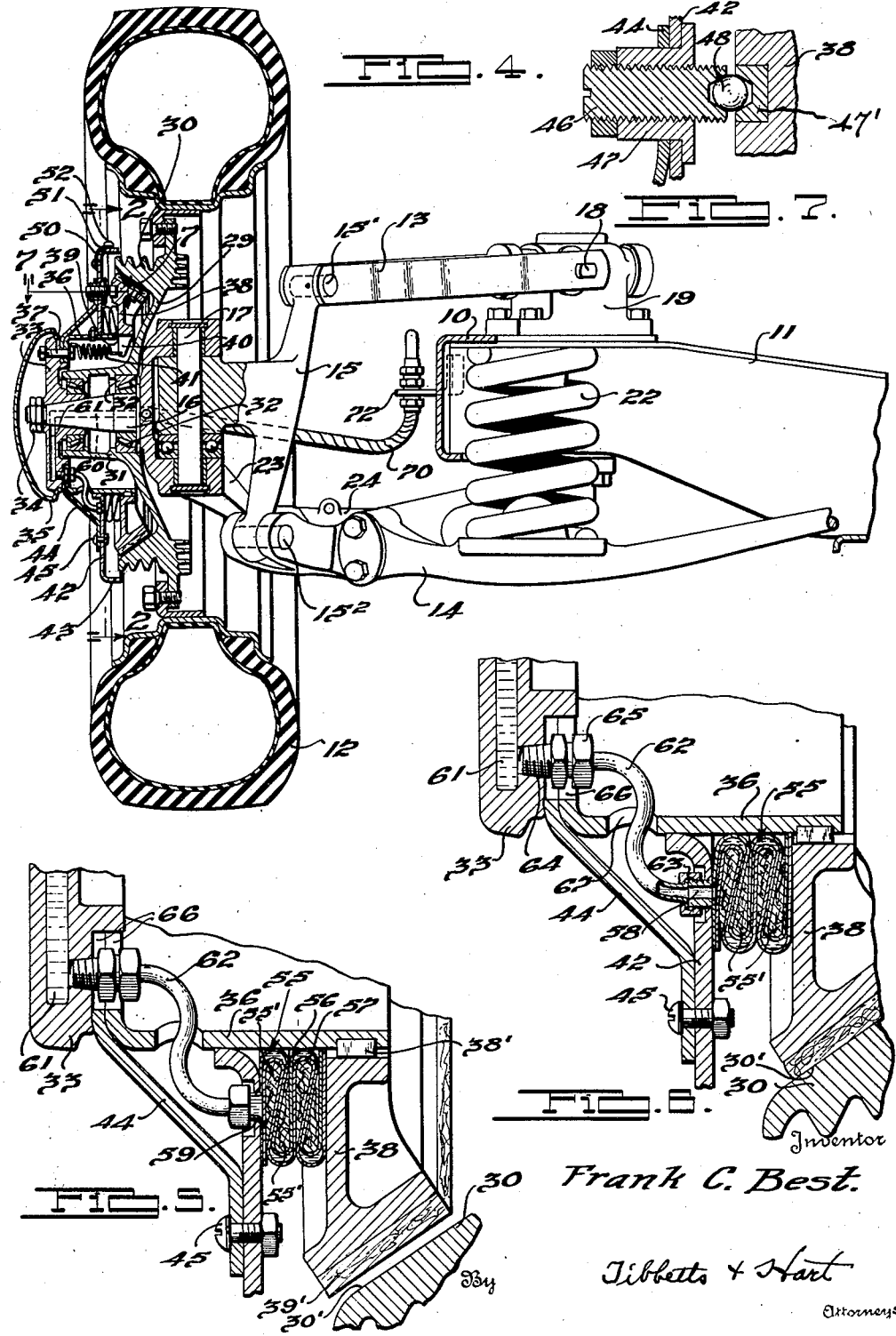

Patented May 9, 1939

2,157,473

UNITED STATES PATENT OFFICE 2,157,473

BRAKE FOR MOTOR VEHICLES

Frank C. Best, Detroit, Mich., assignor to Packard Motor Car Company, Detroit, Mich., a corporation of Michigan Application June 12, 1936, Serial No. 84,902

17 Claims. (Cl. 188—152)

This invention relates to vehicles and more particularly to vehicle braking systems.

One of the present trends in motor vehicle development is toward increased speed, and because of this it becomes desirable to decrease road wheel diameter and tire inflation pressure and to increase tire cross section. Reduction of wheel diameter lessens the flywheel effect of wheels whereby starting, accelerating and braking conditions are improved, while increased tire cross section and reduction of tire inflation pressure improve the riding qualities of a vehicle.

Increasing tire cross section and reducing tire inflation pressure cause no difficulty in vehicle design, but decreasing wheel diameter often provides complications which prevent reduction of wheel diameter to a desired dimension. The brake drum diameter must be reduced when wheel diameter is reduced and at the same time the braking surface area must be maintained and this is accomplished usually by increasing the axial dimension of the drum. When the drum is located on the inside of the wheel, the supporting or mounting elements are at least partially telescoped thereby and reduced drum diameter or increased drum length often results in interference restricting wheel movement and as a result the reduction of wheel diameter must often be restricted more than is desired.

An object of the invention is to provide an efficient vehicle braking system for wheels of small diameter of a character such that wheel movement is not restricted.

Another object of the invention is to provide a hydraulic braking system for vehicles having relatively small diameter wheels in which an adequate braking surface is provided without interfering with desired wheel movement.

A further object of the invention is to provide a wheel braking system in which clearance between the braking surfaces can be adjusted exteriorly of and without removing the wheels.

Another object of the invention is to provide hydraulic operated actuator means for exterior vehicle wheel brakes of a character such that an even pressure will be applied around the braking surface.

Other objects of the invention will appear from the following description taken in connection with the drawings, which form a part of this specification, and in which:

Fig. 1 is a plan view of the forward end of the motor vehicle chassis having my invention incorporated therewith;

Fig. 2 is a sectional view taken on line 2—2 of Fig. 4;

Fig. 3 is a perspective view of the brake actuator element;

Fig. 4 is a fragmentary front elevational view, partly in section, of the chassis;

Fig. 5 is a fragmentry enlarged view of the brake applying mechanism shown in Fig. 4, the brake being in released position;

Fig. 6 is a view similar to Fig. 5 but showing the brake in applied position;

Fig. 7 is a sectional view taken on line 7—7 of Fig. 4.

Referring to the drawings by characters of reference, the forward end of a motor vehicle chassis is illustrated as consisting of longitudinally extending side frame members 10 and a cross member 11. At each side of the front portion of the frame is arranged a wheel as indicated at 12, these front wheels being similar and connected with the frame in a similar manner. Each wheel mounting is independent and in the form of axle means consisting of an upper link 13, a lower triangular link 14, a wheel carrier 15 pivoted at 15' and 15² to the outer ends of the upper and lower links, and a spindle 16 connected with the carrier by a king pin 17. The inner ends of the upper links are mounted on shafts 18 of hydraulic shock absorbers 19 which are fixed on the main frame, and the ends of the angular lower links are pivotally connected with the main frame as indicated at 20 and 21. Between each angular lower link and the main frame is arranged a coil spring 22.

The wheels are swung laterally for steering in a conventional manner. Fixed to the spindles are arms 23 to which are pivoted cross rods 24 and these rods 24 are pivotally connected to a lever 25 suitably connected for pivotal movement to the underside of the cross member 11. The lever 25 is rocked by the usual linkage 26 operated by gears in a housing 27, such gears being manually actuated by shaft 28.

It is desirable that the king pins be located substantially in the vertical center line of the wheel and by forming the webs 29 of the wheels so that they curve outwardly I am able to accommodate the king pins in this relation. When the brake drums are arranged on the interior of the wheels the minimum wheel diameter is sometimes restricted because the brake drum in order to have a sufficient friction braking surface must be extended axially of the wheel to an extent such that it would interfere with movement of the axle means in a vertical direction and with movement of the wheel in a lateral or steering direction. In order to eliminate such interferences so that the wheels can be made as small in diameter as may be desired, I propose to associate the brake mechanisms with the outer surface of the wheels.

The brake mechanism for each wheel is similar and therefore the following description of one will suffice. The brake surface is arranged so that it is exposed on the exterior of the wheel and in the present instance it forms the inner wall of a drum or outwardly extending flange 30 which is formed integral with the wheel web 29. This friction surface is circular and concentric with the wheel axis and with the wheel hub 31 which projects outwardly from the web. The hub telescopes the spindle 16 and suitable bearings 32 are provided therebetween. The wheel hub is held axially on the spindle by retaining means which, in the present instance, takes the form of a disk 33 wedged into fixed relation on the spindle in fixed relation therewith by nuts 34. The inner race of the outer bearing 32 is carried by the retainer disk and the inner race of the inner bearing is carried by the spindle 16. A suitable cap or cover 35 formed of resilient metal is snapped over the outer end of the disk retaining member and engages in a groove formed in the periphery thereof.

The wheel hub and spindle are telescoped by a sleeve 36 having a turned in outer end secured to the inner face of the cap member by bolts 37. This sleeve is spaced from the wheel hub and serves as a support for the hub of the brake disk 38 located exteriorly of the wheel, the disk being held from rotating by the key 38'. The sleeve is formed with slots 39 in its inner end through which fingers 40 on the brake disk project, and coil springs 41 are connected at one end to the fingers and at the other end are fastened to the disk retainer by the bolts 37. The brake disk is slidable axially upon the sleeve and is formed with a head carrying brake lining material 39' complementary to and arranged to engage the brake surface 30' on the flange 30 of the wheel web. These springs exert a force which will normally move the brake disk out of engagement with the friction surface on flange 30. It will be seen that the sleeve encloses the hub portion of the wheel and also the means for moving and holding the brake disk in disengaged position.

Anchor means in the form of a disk 42 is fixed on the sleeve intermediate the disk retainer and the brake disk and it is of a dimension such that its in-turned outer edge 43 will envelope the friction surface on the wheel flange 30 and of course the brake disk which co-operates therewith.

A disk 44 is secured between the disk retainer and the in-turned flange of sleeve 36 by the bolts 37 and is secured around its periphery to the anchored disk by suitable fastening means 45. This disk member 44 serves to brace the anchor disk 42.

In order to maintain a substantially uniform axial movement of the brake disk from released to applied positions, I associate with the disk and the anchor disk a plurality of take-up devices. Each of these devices consists of a threaded axially adjustable screw member 46 which is carried by a bearing 47 fixed to and extending through the anchor disk 42. In alignment with each of these screw members is a bearing element 47' pressed into the brake disk and between each of such bearing elements and screw members is seated a ball 48. The adjacent ends of the screw members and the bearings being recessed sufficiently to maintain the balls therebetween. By applying a screw driver to the exposed end of the adjustable take-up members they can be turned to vary the distance the brake element can be moved away from the brake surface. In order to inspect and engage this degree of spacing between the braking surfaces, I provide an opening 50 in the anchor disk which is normally closed by a movable cover 51 pivoted as at 52. This opening 50 is in alignment with the braking surface on the drum 30 so that a gauge can be inserted to determine the space between the brake member and the drum and thereby regulation of the take-up members can be determined.

Located between the anchor means and the outer face of the brake disk 38 is arranged a hydraulically controlled actuator indicated generally at 55. This actuator is in the form of an axially expansible envelope ring consisting of two sheets of flexible metal 56 and 57 sealed around their edges and folded twice to form a sinuous chamber. Spacing rings 55' are arranged between the folds of ring 55. One side of this ring bears against the outer face of the brake disk and the other face of the ring bears against the base portion of the anchor means. Formed on the outer face of the ring is a threaded nipple 58 which extends through an opening 59 in the disk 42 and this relation of the nipple with the disk provides an anchor for the ring actuator. The ring telescopes the sleeve 36 and lies closely adjacent thereto.

With this actuator ring there is associated hydraulic pressure means whereby the ring can be expanded axially to apply the brake disk 38 to the friction braking surface on drum 30. In the spindle and extending through the inner end thereof is formed an angular passage 60. This passage is arranged to communicate with a radial passage 61 in the cap retainer member and connecting the passage 61 with the nipple 58 is a conduit 62. A suitable nut 63 retains one end of the conduit connected with the nipple 58 and the other end of the conduit is secured to a nipple 64 by a nut 65, the nipple 64 being screwed into an opening through the inside face of the retainer cap in communication with the passage 61. In order to accommodate the nipple 64, the reinforcing member 44 and the sleeve 36 are formed with openings 66 and the sleeve 36 is formed with another opening 67 through which the conduit 62 extends. A flexible conduit 70 is fixed to the inner end of the spindle so that it communicates with the passage 60 and the other end of such conduit is suitably anchored on a plate 72 fixed to the side frame of the vehicle. Conduits 73 extend from each of the conduits 70 to a cylinder 74. The conduits, the passages in the spindles and the retainer caps, and the chambers in the actuator rings are substantially filled with a suitable fluid and in the cylinder 74 is a suitable mechanism operated by the foot lever 75 for exerting pressure against the fluid in the system. When pressure is exerted on the fluid in the system, the fluid will be moved into the actuator rings and will expand the same axially, as shown in Fig. 6, and will thereby apply an even pressure around the brake disks 38 moving them into frictional contact with the adjacent drum surface. When the pressure against the foot lever 75 is released, spring 76 will return the same and its controlled mechanism to normal position whereupon the pressure applied to the fluid in the braking system will be relieved and the springs 41 will contract the actuator rings thereby moving the brake disks out of engagement with the braking surfaces on the flanges 30.

I preferably form the braking surface on the drum portion 30 of the wheel web so that it extends at an angle to the vertical plane of the wheel and preferably in the form of a cone. The periphery of the brake disk is formed to extend complementary to the braking surface and the conventional brake lining material 7 is associated with the periphery thereof. This conical arrangement of the braking surfaces permits the provision of a large braking area within a space between the wheel web and the outer wall of the tire and hence the brake mechanism will not be unduly projected beyond the outer extremity of the tire.

The mechanism herein described provides a simple form of braking which permits the use of a relatively small diameter wheel without interference with the wheel mounting elements so that an adequate braking surface is provided without sacrificing desired wheel movement. The hydraulic brake actuating means is simple and compact and it is so designed and related with the wheel structure that a uniform pressure will be applied around the brake disk to move it into frictional engagement with the braking surface and because of this brake lining wear will be gradual.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle, a wheel spindle having a passage therein, a wheel rotatably mounted on said spindle, a brake drum carried with and extending outwardly from the exterior of the wheel, shiftable brake means mounted to engage the inner surface of the drum, an actuator device expansible to apply said brake means against said brake drum surface, hydraulic pressure means connected with the interior of said expansible actuator through the passage in said spindle, and means normally urging said brake drum means out of engaging relation with said brake surface.

2. In a vehicle, a spindle having a duct extending lengthwise thereof, a hydraulic connection leading to the inner end of the duct in said spindle, a wheel rotatably mounted on said spindle, wheel retaining means on the outer end of said spindle having a duct therein communicating with the duct in said spindle, a brake drum carried by and exposed exteriorly of said wheel, a brake member intermediate the wheel and the retainer for engaging said drum, means normally urging said brake member away from contact with said brake drum, a hollow expansible actuator ring between said retainer and said brake member, the outer end of said actuator ring being anchored and the inner end engaging the brake member, and a conduit connecting the retaining means duct with the interior of the actuator ring.

3. In a vehicle, a spindle having a duct extending in an axial direction therein, a hydraulic pressure system in communication with the inner end of the duct in said spindle, a wheel rotatably mounted on said spindle, a wheel retainer member on the outer end of said spindle having a radial duct therein communicating with the duct in said spindle, a brake drum carried by and exposed exteriorly of said wheel, an axially movable disk brake member telescoping the spindle intermediate the wheel and the retainer member, means normally urging the brake member away from contacting relation with said brake drum, an axially expansible hollow ring element telescoping said spindle intermediate said retainer member and said brake member, the outer end of said actuator being anchored and the inner end engaging said brake member, and means connecting the retainer member duct with the interior of said expansible ring element.

4. In a vehicle, a wheel spindle, a wheel rotatably mounted on said spindle, a wheel retaining member fixed on the outer end of said spindle, a brake drum carried with and exposed exteriorly of said wheel, an axially shiftable brake disk telescoping said spindle and arranged to engage said brake drum, a hollow expansible member telescoping said spindle in relation to apply said brake disk against said drum, anchor means carried by said wheel retainer against which the outer end of said hollow expansible member engages, means normally urging said brake disk out of engaging relation with said brake drum, and hydraulic pressure means connected with said hollow expansible member.

5. In a vehicle, a wheel spindle, a wheel rotatably mounted on said spindle, a wheel retainer member fixed on the outer end of said spindle, an exposed brake drum carried with and projecting from the outer side of said wheel, an axially adjustable disk brake telescoping said spindle intermediate said retainer member and said disk, springs anchored at one end to said retainer member and at their other end to said brake disk for exerting a force tending to move the disk away from engagement with the brake drum, and hydraulic means intermediate said retainer member and said disk expansible to force said disk into engagement with said brake drum.

6. In a vehicle, a wheel spindle, a wheel rotatably mounted on said spindle, wheel retaining means fixed on the outer end of said spindle, a sleeve fixed to and extending inwardly from said retaining means and telescoping the exposed portion of said spindle, a brake drum carried with and exposed exteriorly of the wheel, a brake disk axially slidable on said sleeve, means within said sleeve normally urging said brake disk away from said brake drum, and hydraulic means telescoping said sleeve and expansible to move said brake disk into engaging relation with said brake drum.

7. In a vehicle, a wheel spindle, a wheel rotatably mounted on said spindle, a brake drum extending outwardly from and carried by the wheel, wheel retaining means fixed on the outer end of said spindle, a sleeve extending from said retainer means toward said wheel, a brake disk axially slidable on said sleeve, means normally urging said brake disk away from said brake drum, a radial flange around said sleeve, a hollow expansible ring member anchored to said flange and engaging said disk, and a fluid pressure connection leading to said hollow expansible member.

8. In a vehicle, a wheel spindle, a wheel rotatably mounted on said spindle, a wheel retainer means fixed on the outer end of said spindle, a circular brake drum carried by and exposed exteriorly of the wheel, a brake disk movable axially to engage and disengage said brake drum, a circular flange element intermediate said brake disk and said retaining means, said flange element being in fixed relation with said wheel retaining means and enclosing said brake drum and said brake disk, and hydraulically expansible means intermediate said flange and said brake disk operable to move said brake disk into engaging relation with said brake drum.

9. In a vehicle, a wheel spindle, a wheel rotatably mounted on said spindle, a wheel retainer member fixed on the outer end of said spindle, a sleeve fixed to and extending inwardly from said retainer member, a brake drum having a friction surface carried with and exposed exteriorly of said wheel, a brake disk axially slidable on said sleeve and movable into a relation engaging said brake drum surface, a flange extending around said sleeve and enclosing said friction drum surface and said brake disk, said flange having an opening therein located to allow inspection and gauging of the clearance between said brake disk and said brake drum surface, an axially expansible hollow ring member anchored to said flange and engaging said brake disk, hydraulic pressure means for expanding said ring axially to move said disk into engagement with said brake drum surface, and means normally urging said brake disk away from said brake drum surface.

10. In a vehicle, a wheel spindle, a wheel rotatably mounted on said spindle, a wheel retaining member fixed on the outer end of said spindle, a slotted sleeve extending inwardly from said retaining member in telescoping relation with the exposed end of said spindle outside of the wheel, a brake drum carried with and projecting outwardly from the exterior of the wheel beyond the slotted end of said sleeve, a brake disk axially movable on said sleeve, said brake disk having fingers extending through the slots in said sleeve, coil springs connecting said fingers with said retaining member to normally urge said disk away from engaging relation with said brake drum, and hydraulically actuated means exteriorly of said brake disk for forcing the same into engaging relation with said drum surface.

11. In a vehicle, a wheel spindle, a wheel rotatably mounted on said spindle, a wheel retaining member fixed on the outer end of said spindle, a brake drum carried with and projecting outwardly from the exterior of said wheel, a sleeve telescoping the portion of the spindle intermediate said retaining member and said wheel, means securing said sleeve to said retaining member, a brake disk axially slidable on said sleeve and engageable with said brake drum, a peripheral flange extending radially from and fixed to said sleeve between said retaining member and said brake disk, a hollow axially expansible ring telescoping said sleeve intermediate said flange and said brake disk, hydraulic pressure means connected with the interior of said hollow ring, the expansion of said ring moving said disk into engaging relation with the said brake drum, and means normally urging said brake disk away from contact with said brake drum.

12. In a vehicle, a spindle having a duct extending lengthwise thereof, a hydraulic connection leading to the inner end of the duct in said spindle, a wheel rotatably mounted on said spindle, a wheel retaining member fixed on the outer end of said spindle having a radially extending duct therein in communication with the duct in said spindle, a brake drum carried by and exposed exteriorly of said wheel, a sleeve extending inwardly from said retaining member and telescoping the portion of said spindle between the retaining member and the wheel, a brake disk axially slidable on said sleeve and engageable with said brake drum surface, a peripheral flange extending radially from said sleeve between said retainer member and said brake disk, an expansible hollow ring around the sleeve intermediate said flange and said brake disk, means normally urging said brake disk away from said brake drum surface, and a conduit connecting the duct in said retainer member with the interior of said hollow ring, said conduit extending through said sleeve and said flange.

13. In a vehicle, a wheel spindle, a wheel rotatably mounted on said spindle, a wheel retaining member fixed on the outer end of said spindle, a brake disk axially movable between said wheel and said retainer member, a brake drum carried by and exposed exteriorly of said wheel with which said brake disk is adapted to engage, an anchor member fixed to said retainer member beyond said brake disk, an expansible hollow ring member between said anchor member and said brake disk and fixed to the anchor member, means for connecting hydraulic power means with the interior of said expansible ring, and means normally urging said brake disk away from said brake drum surface.

14. In a vehicle, a wheel spindle having a duct therein connected with hydraulic means, a wheel rotatably mounted on said spindle, a brake drum on the outer face of said wheel and associated to rotate therewith, brake means carried by the spindle exteriorly of the wheel and shiftable to engage said brake drum, an actuator envelope expansible to force said brake means into engagement with the brake drum, means connecting said envelope with the duct in said spindle, and means normally disengaging said brake means from said drum.

15. In a vehicle, a spindle, a wheel rotatably mounted on the spindle, a brake surface fixed to said wheel, a brake element movable to cooperate with the brake surface on said wheel, wheel retainer means fixed on said spindle having passage means therein connected with a fluid pressure system, an enclosure member for the brake surface and brake element fixed to the retainer, and expansible means in communication with the passage means in said wheel retainer means for applying said brake element, said expansible means being fixed to an inner portion of said enclosure member.

16. In a vehicle, the combination of a wheel having a brake surface fixed thereto, a wheel retainer having passage means communicating with fluid pressure means, a movable brake element, a bellows for actuating said brake element, means fixed to said retainer substantially enclosing said brake surface and said brake element, said bellows being anchored to said enclosure means and communicating with the passage means.

17. In a vehicle, a spindle, a wheel mounted on the spindle having an exterior brake surface, movable brake element outside of the wheel brake surface, a wheel retainer fixed to the spindle outside of said brake element, and means fixed to said retainer substantially enclosing said brake surface and said brake element.

FRANK C. BEST.